United States Patent
Chen et al.

(10) Patent No.: US 8,840,473 B2
(45) Date of Patent: Sep. 23, 2014

(54) SHOOTING EQUIPMENT SHOOTING DIRECTION CONTROL SYSTEM FOR SHOOTER GAME

(71) Applicant: AXPRO Technology Inc., Taipei (TW)

(72) Inventors: Peng-Hsien Chen, Taipei (TW); Fa-Quey Lai, Taipei (TW); Ying-Fu Lin, Taipei (TW); Shih-Hao Wang, Taipei (TW)

(73) Assignee: Axpro Technology Inc., Taipei (TW)

( * ) Notice: Subject to any disclaimer, the term of this patent is extended or adjusted under 35 U.S.C. 154(b) by 57 days.

(21) Appl. No.: 13/801,417

(22) Filed: Mar. 13, 2013

(65) Prior Publication Data

US 2014/0024455 A1    Jan. 23, 2014

(30) Foreign Application Priority Data

Jul. 20, 2012  (TW) .............................. 101214111 U

(51) Int. Cl.
| | |
|---|---|
| *A63F 13/08* | (2006.01) |
| *A63F 13/06* | (2006.01) |
| *F41A 33/00* | (2006.01) |
| *A63F 9/02* | (2006.01) |
| *A63F 13/20* | (2014.01) |
| *A63F 13/00* | (2014.01) |
| *G05G 9/047* | (2006.01) |

(52) U.S. Cl.
CPC .............. *A63F 13/005* (2013.01); *F41A 33/00* (2013.01); *A63F 9/0291* (2013.01); *A63F 13/06* (2013.01); *A63F 2009/0256* (2013.01); *A63F 2300/1043* (2013.01); *G05G 9/047* (2013.01); *A63F 2300/8076* (2013.01)
USPC .................................. 463/37; 463/36; 463/49

(58) Field of Classification Search
CPC ....... A63F 13/005; A63F 13/06; A63F 13/08; A63F 2300/1043; A63F 2300/8076; A63F 2300/0256
USPC ................................................ 463/36–37, 49
See application file for complete search history.

(56) References Cited

U.S. PATENT DOCUMENTS

| | | | | |
|---|---|---|---|---|
| 2,520,281 A | * | 8/1950 | Heide ............................... | 434/18 |
| 2,527,326 A | * | 10/1950 | New .................................. | 463/57 |
| 2,845,270 A | * | 7/1958 | Durant ............................ | 463/49 |
| 3,990,704 A | * | 11/1976 | Meyer et al. .................... | 463/52 |
| 4,007,934 A | * | 2/1977 | Ochi ............................... | 463/49 |
| 4,099,719 A | * | 7/1978 | Dean et al. ....................... | 463/5 |
| 4,175,748 A | * | 11/1979 | Yokoi .............................. | 463/52 |
| 4,268,036 A | * | 5/1981 | Yokoi .............................. | 463/49 |
| 4,285,523 A | * | 8/1981 | Lemelson ......................... | 463/5 |

(Continued)

*Primary Examiner* — Dmitry Suhol
*Assistant Examiner* — David Duffy
(74) *Attorney, Agent, or Firm* — Muncy, Geissler, Olds & Lowe, P.C.

(57) ABSTRACT

A shooting equipment shooting direction control system includes a base unit including a circuit module, a transmission mechanism and a driver controllable by a first micro switch and a second micro switch of the circuit module to rotate the transmission mechanism horizontally left and right, a rotary holder shell coupled and rotatable by the transmission mechanism to move a baffle between the first micro switch and the second micro switch, and a shooting equipment including an equipment base, a power drive unit controllable by the circuit module through a third micro switch and a fourth micro switch in the rotary holder shell to rotate the equipment base vertically up and down relative to the rotary holder shell and a dogleg-shaped trigger movable with the equipment base relative to the rotary holder shell between the third micro switch and the fourth micro switch.

9 Claims, 10 Drawing Sheets

(56) References Cited

U.S. PATENT DOCUMENTS

| | | | |
|---|---|---|---|
| 4,616,833 A * | 10/1986 | Geller | 463/51 |
| 4,895,376 A * | 1/1990 | Chiang Shiung-Fei | 463/2 |
| 5,127,657 A * | 7/1992 | Ikezawa et al. | 463/5 |
| 5,190,286 A * | 3/1993 | Watanabe et al. | 463/5 |
| 5,248,150 A * | 9/1993 | Koma | 463/5 |
| 5,795,224 A * | 8/1998 | Yoshida | 463/2 |
| 6,206,783 B1 * | 3/2001 | Yamamoto et al. | 463/36 |
| 6,458,034 B1 * | 10/2002 | Aiki et al. | 463/49 |
| 8,535,154 B2 * | 9/2013 | Minato et al. | 463/32 |
| 2012/0058823 A1 * | 3/2012 | Minato et al. | 463/32 |
| 2013/0109475 A1 * | 5/2013 | Hamano et al. | 463/31 |

\* cited by examiner

SHOOTING EQUIPMENT SHOOTING DIRECTION CONTROL SYSTEM FOR SHOOTER GAME

This application claims the priority benefit of Taiwan patent application number 101214111, filed on Jul. 20, 2012.

BACKGROUND OF THE INVENTION

1. Field of the Invention

The present invention relates to shooter game technology and more particularly, to a shooting equipment shooting direction control system for shooter game, which facilitates quick and accurate adjustment of the shooting direction of the shooting equipment in horizontal direction as well as vertical direction subject to the control of micro switches, improving the shooting accuracy and the quality of the shooting game and avoiding aiming error due to the effect of the weight of the shooting equipment.

2. Description of the Related Art

With continuous progress in innovative technologies, many electronic technology based products, implements and related software and hardware designs have been continuously created to serve people, making people's daily life and daily working so convenient and causing people to change their daily habits. Nowadays, online video games and virtual reality video games can treat pain, and release school stress, workplace stress and tension. When playing online video games, in addition to the applied application software, the mating operating tool takes an important role in performance. Keyboard, mouse and joystick are commonly used as an operating tool for video games. Further, shooting equipments are intensively used in fighting and war video games. When playing a shooting game, the player must aim the shooting equipment at the shooting target on the screen by oneself and then fire the shooting equipment. However, it is difficult to accurately aim the shooting equipment at the shooting target. When playing a shooting game, the player may encounter the following problems:

1. When holding the shooting equipment and facing the screen, the player must close one eye and use the other eye to aim the sight of the shooting equipment at the shooting target on the screen, and the player's vision will affect the aiming accuracy, resulting in a missed shot.
2. A shooting equipment for video shooting game has a certain weight that can affect the stability of the player's hands. If the player holds the shooting equipment for a certain length of time when aiming the shooting target, the hands may be unable to sustain, and the player may need to take a break and then restart to aim the shooting equipment at the shooting target, affecting shooting performance.

Therefore, there is a strong demand for a shooting equipment that facilitates quick and accurate aiming, and eliminates the problem of aiming error due to the effect of the weight of the shooting equipment.

SUMMARY OF THE INVENTION

The present invention has been accomplished under the circumstances in view. It is therefore the main object of the present invention to provide a shooting equipment shooting direction control system for shooter game, which facilitates quick and accurate adjustment of the shooting direction of the shooting equipment in horizontal direction as well as vertical direction, improving the shooting accuracy and the quality of the shooting game and avoiding aiming error due to the effect of the weight of the shooting equipment.

To achieve this and other objects of the present invention, a shooting equipment shooting direction control system comprises a base unit, a rotary holder shell and a shooting equipment. The base unit comprises a circuit module, a transmission mechanism, and a driver controllable by a first micro switch and a second micro switch of the circuit module to rotate the transmission mechanism horizontally left and right. The rotary holder shell comprises an accommodation chamber, an input coupling member suspending in the accommodation chamber and coupled to the transmission mechanism for enabling the rotary holder shell to be rotated horizontally left and right by the transmission mechanism, and a baffle suspending in the accommodation chamber and movable with the rotary holder shell between the first micro switch and the second micro switch. The shooting equipment comprises an equipment base, a power drive unit controllable by the circuit module through a third micro switch and a fourth micro switch in the rotary holder shell to rotate the equipment base vertically up and down relative to the rotary holder shell, and a dogleg-shaped trigger movable with the equipment base relative to the rotary holder shell between the third micro switch and the fourth micro switch.

Further, the first micro switch and the second micro switch are preferably separated in horizontal at a predetermined angle in the range of 80°~150°, or most preferably at 120°; the third micro switch and the fourth micro switch are preferably separated in vertical at a predetermined angle in the range of 20°~90°, or most preferably at 45°.

DETAILED DESCRIPTION OF THE PREFERRED EMBODIMENT

Figure 1:
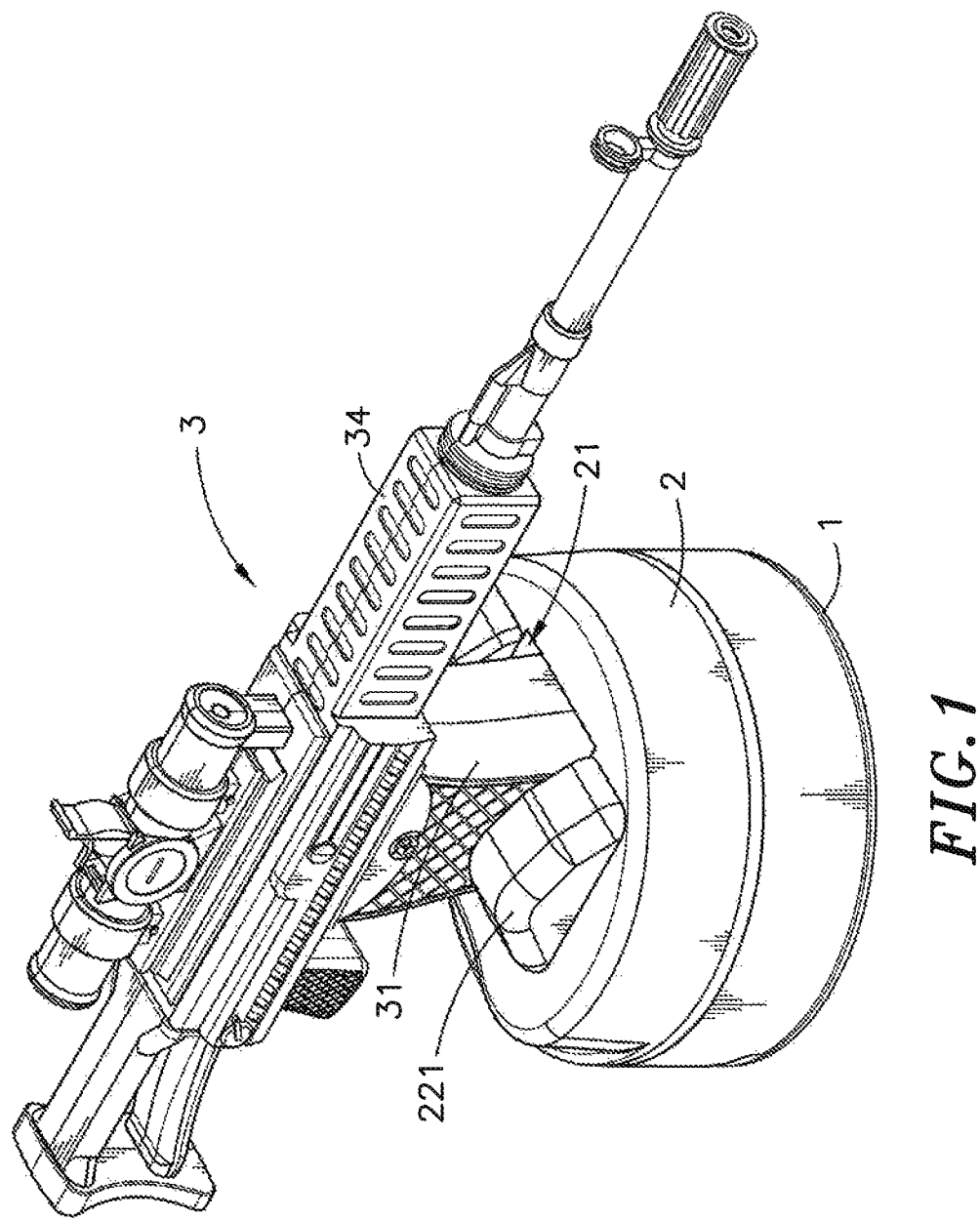
FIG. 1 is an elevational view of a shooting equipment shooting direction control system for shooter game in accordance with the present invention.
Figure 2:
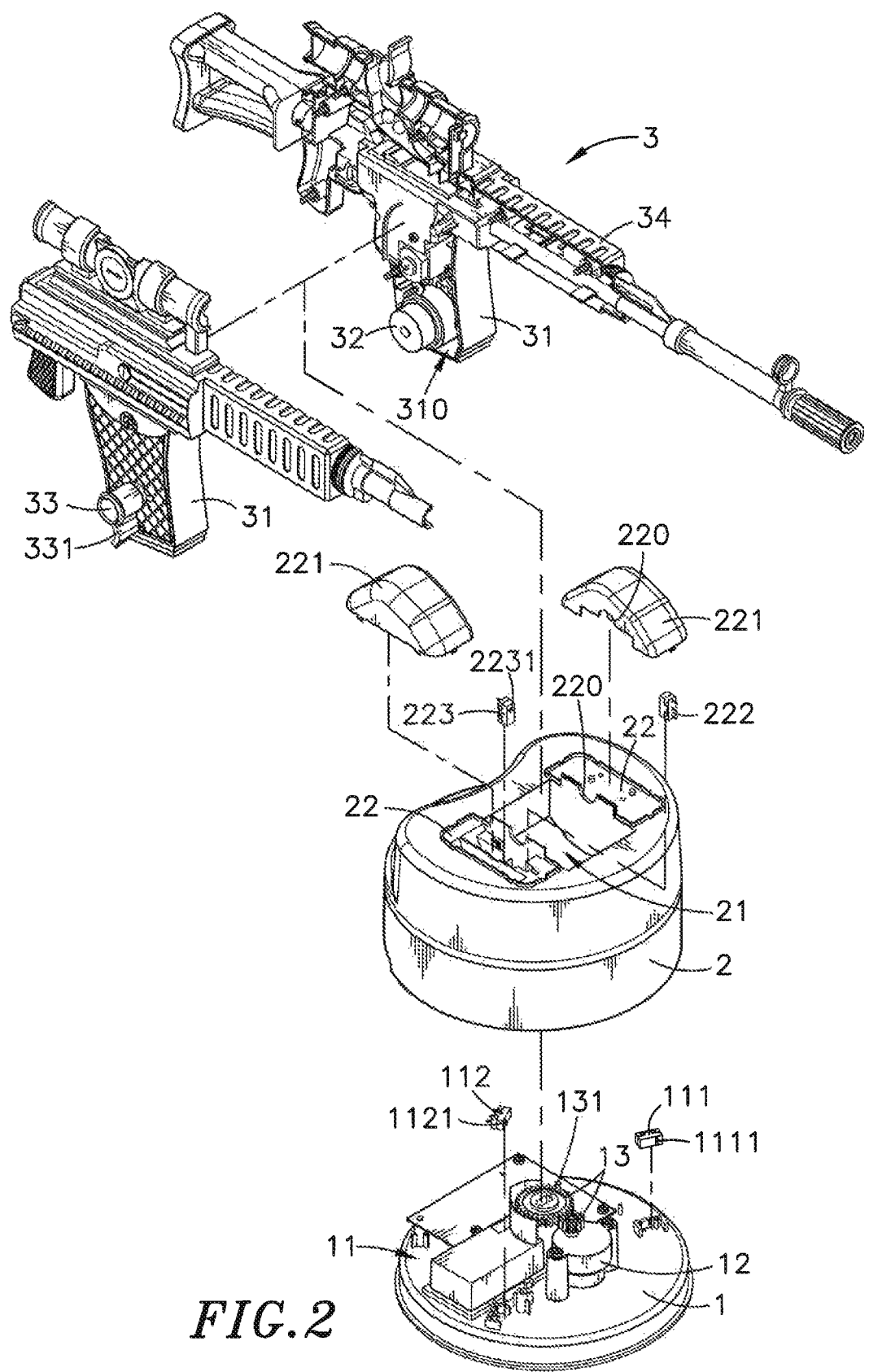
FIG. 2 is an exploded view of the shooting equipment shooting direction control system for shooter game in accordance with the present invention.
Figure 3:
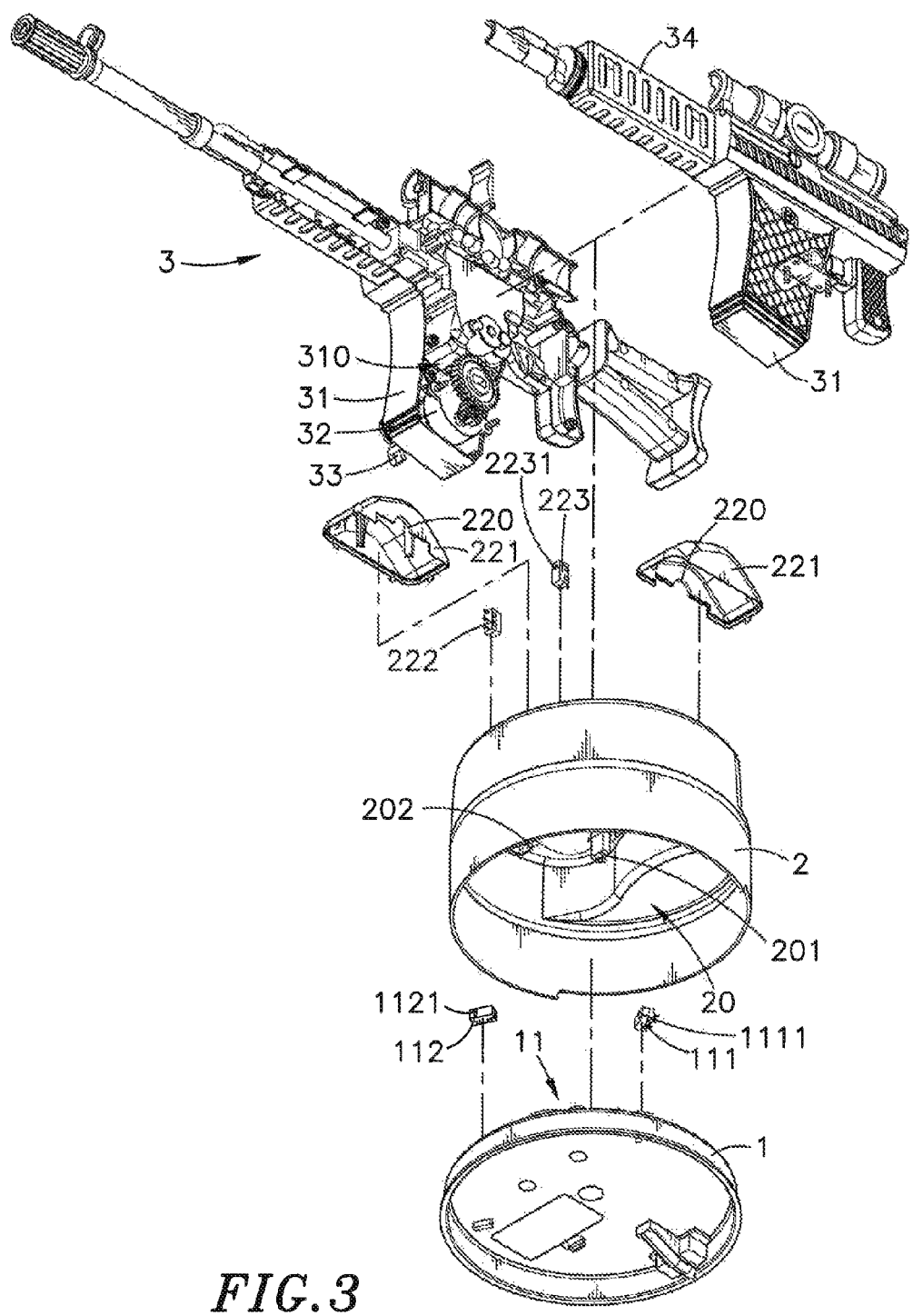
FIG. 3 corresponds to FIG. 2 when viewed from another angle.
Figure 4:
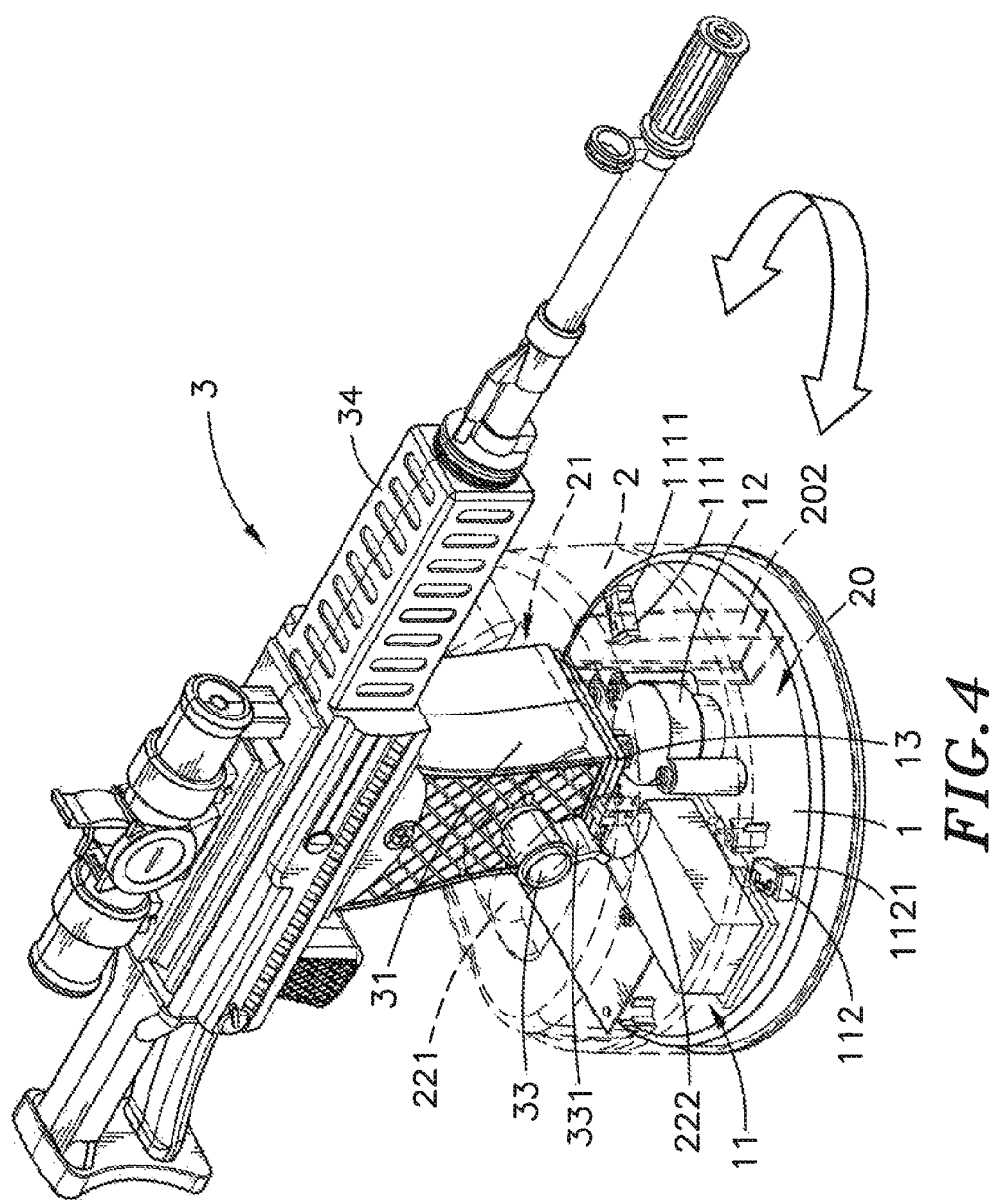
FIG. 4 is a schematic perspective view of the present invention, illustrating adjustment of the shooting equipment in horizontal direction relative to the base unit (I).
Figure 5:
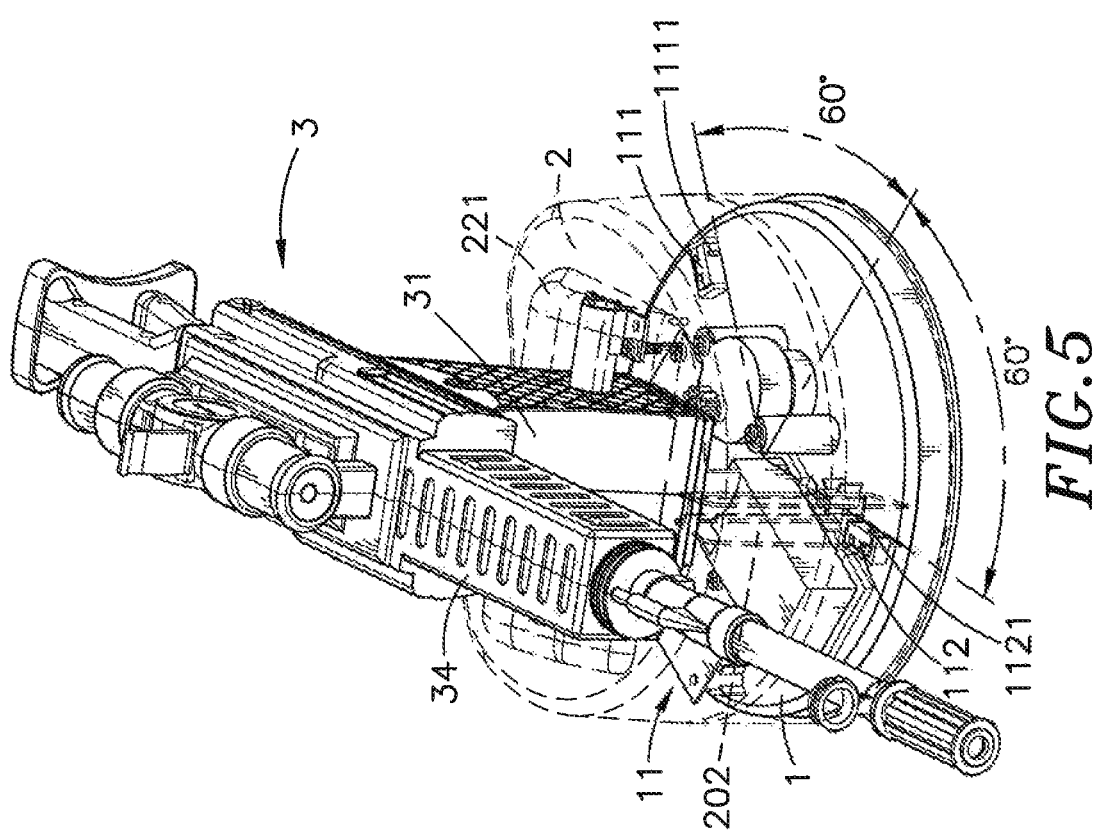
FIG. 5 is a schematic perspective view of the present invention, illustrating adjustment of the shooting equipment in horizontal direction relative to the base unit (II).
Figure 6:
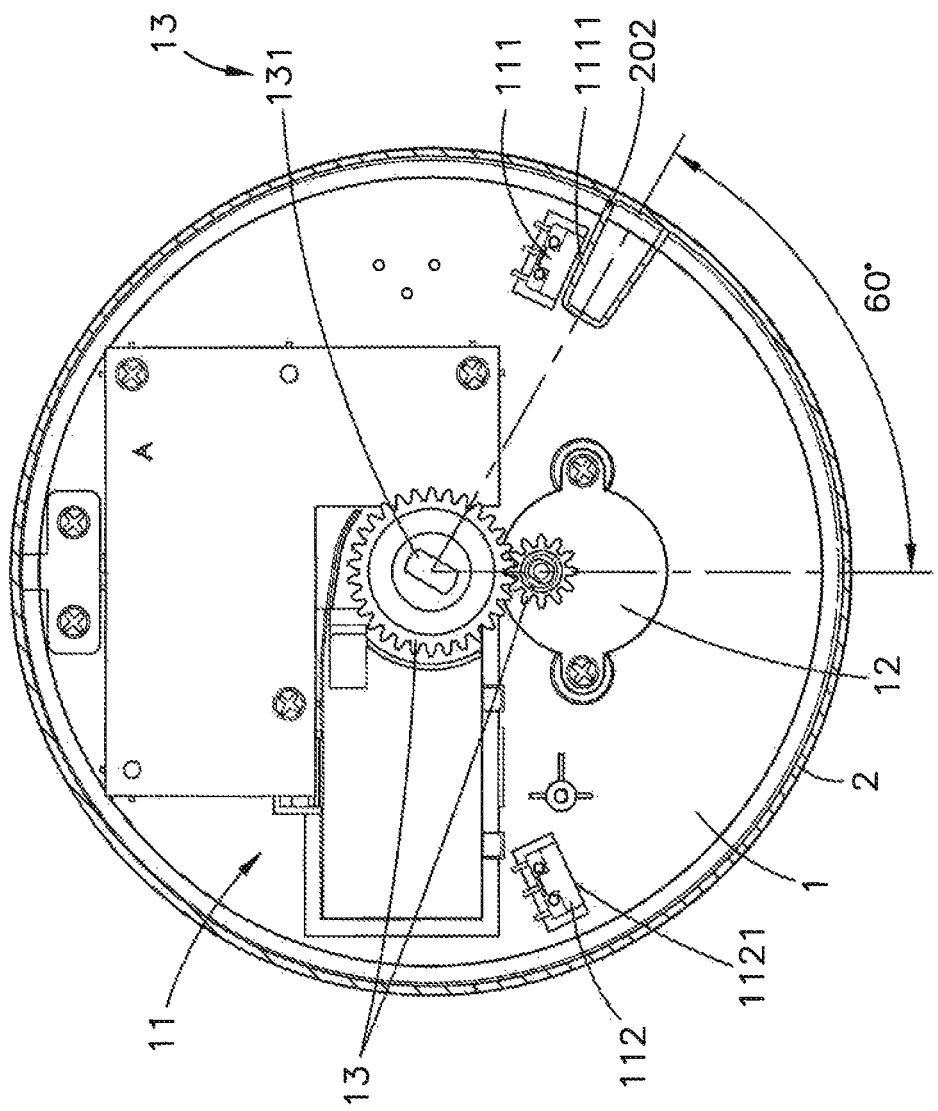
FIG. 6 is a sectional top view of the present invention, illustrating adjustment of the shooting equipment in horizontal direction relative to the base unit (I).
Figure 7:
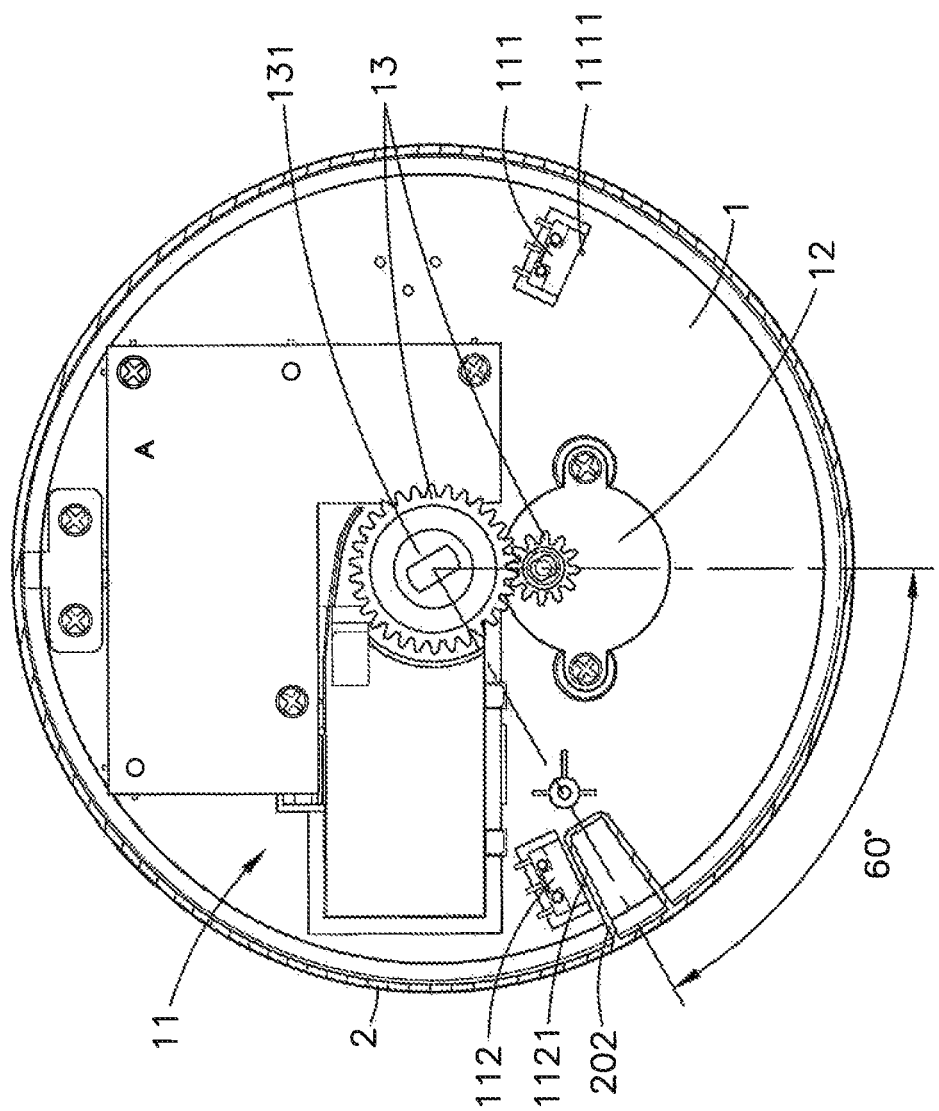
FIG. 7 is a sectional top view of the present invention, illustrating adjustment of the shooting equipment in horizontal direction relative to the base unit (II).

Referring to FIGS. 1-3, a shooting equipment shooting direction control system for shooter game in accordance with the present invention is shown. The shooting equipment shooting direction control system for shooter game comprises a base unit 1, a rotary holder shell 2, and a shooting equipment 3.

The base unit 1 comprises a circuit module 11, a driver 12, and a transmission mechanism 13. The circuit module 11 comprises a first micro switch 111 and a second micro switch 112 arranged facing each other and separated by a predetermined distance. The first micro switch 111 provides a first control button 1111. The second micro switch 112 provides a second control button 1121. The driver 12 is electrically coupled to the circuit module 11 and controllable by the circuit module 11 to rotate the transmission mechanism 13.

The rotary holder shell 2 comprises an accommodation chamber 20, an input coupling member 201 suspending in a top side within the accommodation chamber 20, a baffle 202 suspending in a border area within the accommodation chamber 20, a recessed receiving chamber 21 located in a top wall thereof above the accommodation chamber 20, two pivot seats 22 respectively located at two opposite lateral sides of the recessed receiving chamber 21, two pivot covers 221 respectively capped on the two pivot seats 22, a pivot hole 220 defined in between each pivot seat 22 and the associating pivot covers 221, and a third micro switch 222 and a fourth micro switch 223 mounted in one pivot seat 22 and facing each other and separated by a predetermined distance. The third micro switch 222 provides a third control button 2221. The fourth micro switch 223 provides a fourth control button 2231.

The shooting equipment 3 comprises an equipment base 31 defining therein a storage chamber 310, a power drive unit 32 mounted in the storage chamber 310, two pivot pins 33 respectively arranged at two opposite lateral sides of the equipment base 31, a dogleg-shaped trigger 331 protruded from the periphery of one pivot pin 33, and a gun body 34 mounted at the top side of the equipment base 31. The gun body 34 includes flash hider, butt, barrel, pistol grip, trigger, barrel jacket, front sight, rear sight, cover and other necessary components.

When assembling the shooting equipment shooting direction control system, cap the rotary holder shell 2 on the base unit 1 and connect the input coupling member 201 of the rotary holder shell 2 to the transmission mechanism 13 of the base unit 1 and to suspend the baffle 202 of the rotary holder shell 2 between the first control button 1111 of the first micro switch 111 and the second control button 1121 of the second micro switch 112, and then mount the equipment base 31 of the shooting equipment 3 in the recessed receiving chamber 21 of the rotary holder shell 2 to pivotally couple the two pivot pins 33 of the shooting equipment 3 to the pivot holes 220 between the pivot seats 22 and pivot covers 221 of the rotary holder shell 2 and to suspend the dogleg-shaped trigger 331 of the shooting equipment 3 between the third control button 2221 of the third micro switch 222 and the fourth control button 2231 of the fourth micro switch 223. Thus, the base unit 1, the rotary holder shell 2 and the shooting equipment 3 are assembled, forming the desired shooting equipment shooting direction control system.

Further, the circuit module 11 of the base unit 1 is electrically coupled with the first micro switch 111, the second micro switch 112, the driver 12, the third micro switch 222, the fourth micro switch 223 and the power drive unit 32. By means of rotating the rotary holder shell 2 relative to the base unit 1 to press the baffle 202 against the first control button 1111 of the first micro switch 111 or the second control button 1121 of the second micro switch 112, the driver 12 is stopped and then started to change the rotating direction of the rotary holder shell 2; by means of rotating the pivot pins 33 to press the dogleg-shaped trigger 331 against the third control button 2221 of the third micro switch 222 or the fourth control button 2231 of the fourth micro switch 223, the power drive unit 32 is stopped and then started to change its direction of rotation (i.e., the turning direction of the shooting equipment 3 with the pivot pins 33 relative to the rotary holder shell 2. Further, the driver 12 and the power drive unit 32 can be motors, hydraulic cylinders or pneumatic cylinders; the transmission mechanism 13 of the base unit 1 can be a gear transmission mechanism, belt transmission mechanism, chain transmission mechanism or chain wheel type transmission mechanism. Further, the transmission mechanism 13 of the base unit 1 comprises an output coupling member 131 coupled to the input coupling member 201 of the rotary holder shell 2. Further, the output coupling member 131 can be a male coupling member (or female coupling member), and the input coupling member 201 can be a female coupling member (or male coupling member) mating the male coupling member (or female coupling member) of the output coupling member 131. Further, the male coupling member can be a latch, plug rod, or screw bolt; the female coupling member can be a latch hole, plughole, or screw hole. Further, the driver 12 is controllable to rotate the transmission mechanism 13 between two reversed directions, thereby rotating the rotary holder shell 2 horizontally left and right relative to the base unit 1. Further, the circuit module 11 of the base unit 1 has a self-equipped power supply (dry battery, storage battery, lithium-ion rechargeable battery or accumulator), and a power converter cable for converting external AC power supply to DC power supply for working. Further, the circuit module 11 is electrically connectable to an external operating device (keyboard, mouse, joystick, tablet computer, notebook computer, smart phone, etc.) that can be operated to control the operation of the circuit module 11 by a cable or wireless communication system, driving the driver 12 to rotate the transmission mechanism 13 and the rotary holder shell 2 horizontally relative to the base unit 1 and the power drive unit 32 to rotate the pivot pins 33 and the shooting equipment 3 vertically up and down relative to the rotary holder shell 2.

Further, the power drive unit 32 of the shooting equipment 3 can be a reversible motor, hydraulic cylinder or pneumatic cylinder. Further, a gear transmission mechanism, belt transmission mechanism, chain transmission mechanism or chain wheel type transmission mechanism can be coupled between the inside wall of the storage chamber 310 of the shooting equipment 3 and the power drive unit 32, enabling the shooting equipment 3 to be turned vertically up and down relative to the rotary holder shell 2 by the power drive unit 32.

Referring to FIGS. 4-7 and FIGS. 2 and 3 again, during operation of the shooting equipment shooting direction control system, the circuit module 11 controls the driver 12 to rotate the transmission mechanism 13 and the rotary holder shell 2 horizontally relative to the base unit 1 and the power drive unit 32 to rotate the equipment base 31 of the shooting equipment 3 vertically up and down relative to the rotary holder shell 2. When the rotary holder shell 2 is being rotated by the transmission mechanism 13 horizontally in one direction, the baffle 202 is moved with the rotary holder shell 2 between the first micro switch 111 and the second micro switch 112. The first micro switch 111 and the second micro switch 112 can be separated by a predetermined angle (preferably in the range of 80°~150°, or most preferably at 120°, i.e., 60° leftward and 60° rightward).

Figure 8:
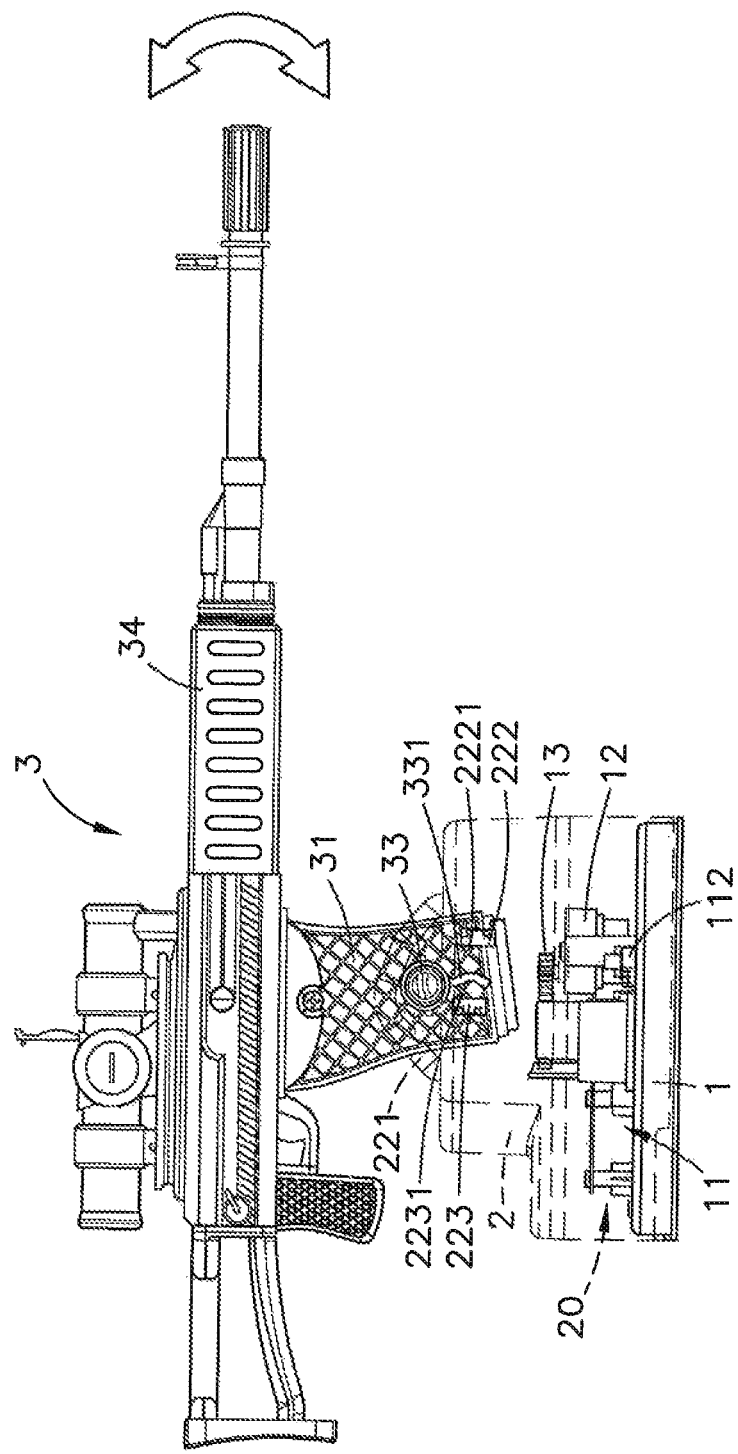
FIG. 8 is a schematic side view of the present invention, illustrating adjustment of the shooting equipment in vertical direction relative to the base unit (I).
Figure 9:
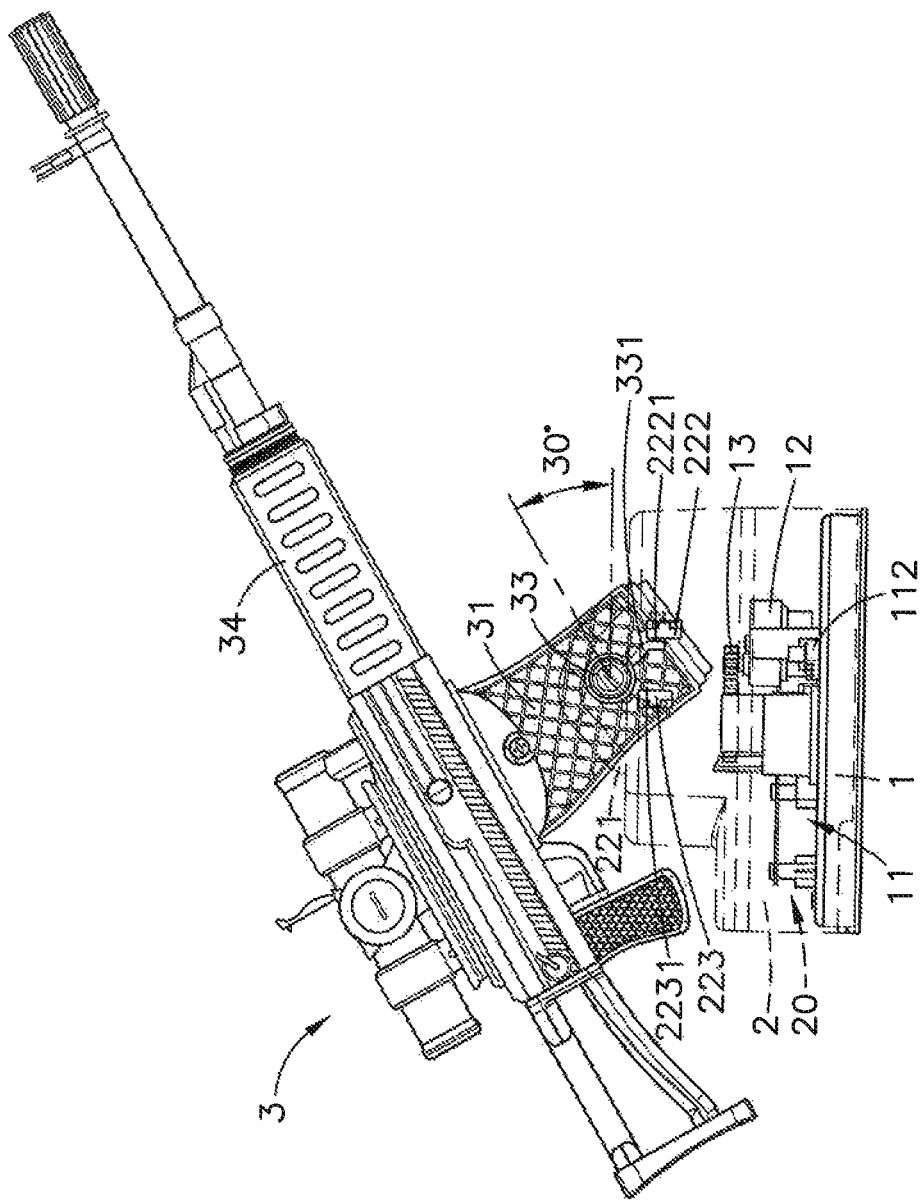
FIG. 9 is a schematic side view of the present invention, illustrating adjustment of the shooting equipment in vertical direction relative to the base unit (II).
Figure 10:
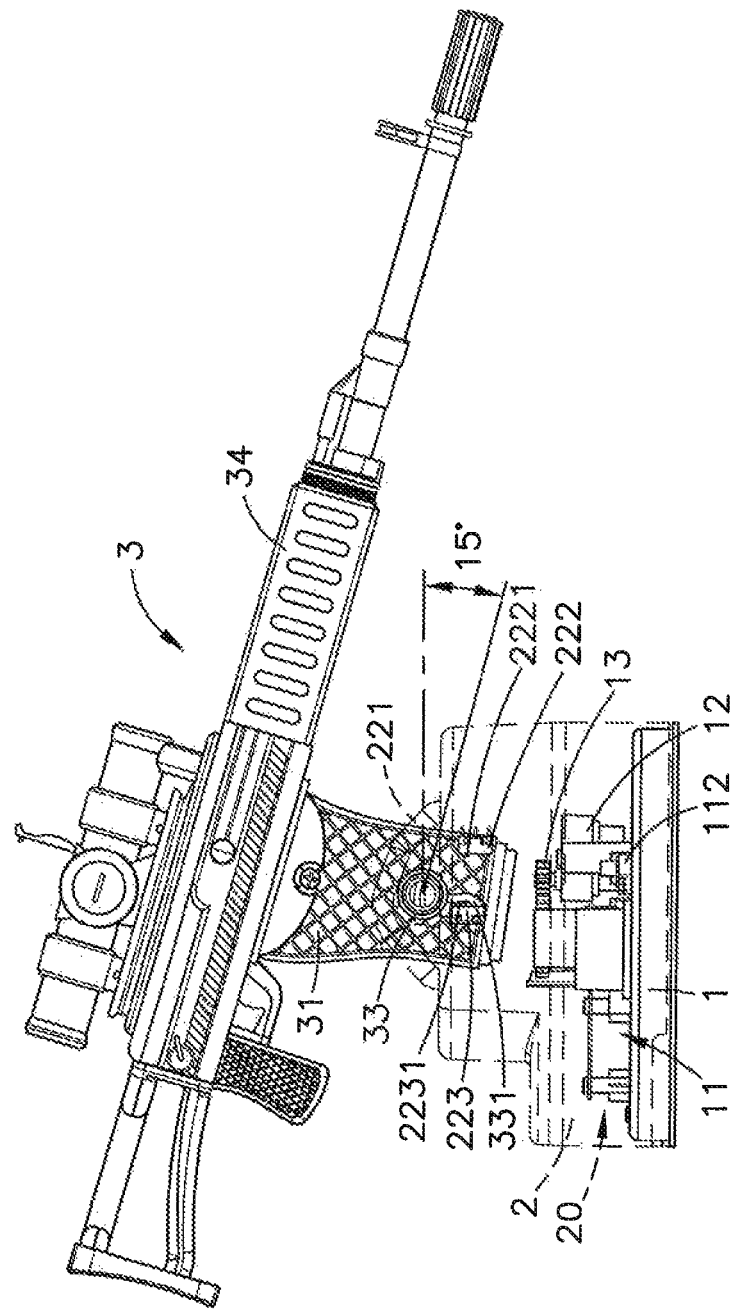
FIG. 10 is a schematic side view of the present invention, illustrating adjustment of the shooting equipment in vertical direction relative to the base unit (III).

When the baffle 202 touches the first control button 1111 of the first micro switch 111 (or the second control button 1121 of the second micro switch 112) during horizontal rotation of the rotary holder shell 2 relative to the base unit 1, the first micro switch 111 (or the second micro switch 112) immediately provides a signal to the circuit module 11, causing the circuit module 11 to reverse the driver 12 and the transmission mechanism 13 in rotating the rotary holder shell 2 in the reversed direction. Referring to FIGS. 8-10 and FIGS. 2 and 3 again, during operation of the shooting equipment shooting direction control system, the circuit module 11 also controls the power drive unit 32 to rotate the equipment base 31 of the shooting equipment 3 vertically up and down relative to the rotary holder shell 2.

When the shooting equipment 3 is being rotated by the power drive unit 32 vertically up and down relative to the rotary holder shell 2, the dogleg-shaped trigger 331 is moved with the pivot pins 33 of the shooting equipment 3 relative to the rotary holder shell 2 between the third micro switch 222 and the fourth micro switch 223. The third micro switch 222 and the fourth micro switch 223 can be separated by a predetermined angle (preferably in the range of 20°~90°, or most preferably at 45°, i.e., 30° angle of inclination and 10° angle of declination).

When the dogleg-shaped trigger 331 touches the third control button 2221 of the third micro switch 222 (or the fourth control button 2231 of the fourth micro switch 223) during vertical rotation of the shooting equipment 3 relative to the rotary holder shell 2, the third micro switch 222 (or the fourth micro switch 223) immediately provides a signal to the circuit module 11, causing the circuit module 11 to reverse the power drive unit 32 in rotating the pivot pins 33 and equipment base 31 of the shooting equipment 3 relative to the rotary holder shell 2 in the reversed direction.

Referring to FIGS. 4-10, by means of controlling the circuit module 11 to control the operation of the driver 12 and the operation of the power drive unit 32, the transmission mechanism 13 and the rotary holder shell 2 can be rotated horizontally relative to the base unit 1 by the driver 12 to move the baffle 202 between the first micro switch 111 and the second micro switch 112, and the pivot pins 33 and equipment base 31 of the shooting equipment 3 can be rotated vertically relative to the rotary holder shell 2 by the power drive unit 32 to move the dogleg-shaped trigger 331 between the third micro switch 222 and the fourth micro switch 223, facilitating quick and accurate adjustment of the shooting direction of the shooting equipment 3 in horizontal direction within the range of 120° and in vertical direction within the range of 45°. Subject to this shooting direction adjustment function, the shooting accuracy and the quality of the shooting game are greatly improved, avoiding aiming error due to the effect of the weight of the shooting equipment 3.

In conclusion, the invention provides a shooting equipment shooting direction control system, which comprises a base unit 1, which comprises a circuit module 11, a transmission mechanism 13 and a driver 12 controllable by a first micro switch 111 and a second micro switch 112 of the circuit module 11 to rotate the transmission mechanism 13 horizontally left and right, a rotary holder shell 2, which comprises an accommodation chamber 20, an input coupling member 201 suspending in the accommodation chamber 20 and coupled to the transmission mechanism 13 for enabling the rotary holder shell 2 to be rotated horizontally left and right by the transmission mechanism 13, a baffle 202 suspending in the accommodation chamber 20 and movable with the rotary holder shell 2 between the first micro switch 111 and the second micro switch 112, and a shooting equipment 3, which comprises an equipment base 31, a power drive unit 32 controllable by the circuit module 11 through a third micro switch 222 and a fourth micro switch 223 in the rotary holder shell 2 to rotate the equipment base 31 vertically up and down relative to the rotary holder shell 2 and a dogleg-shaped trigger 331 movable with the equipment base 31 relative to the rotary holder shell 2 between the third micro switch 222 and the fourth micro switch 223. Thus, subject to the function of the circuit module 11 and the first, second, third and fourth micro switch 111;112; 222;223 to control the operation of the driver 12 and the operation of the power drive unit 32, the transmission mechanism 13 and the rotary holder shell 2 can be rotated horizontally relative to the base unit 1 within the range of 120° and the equipment base 31 of the shooting equipment 3 can be rotated vertically relative to the rotary holder shell 2 within the range of 45°.

As stated above, the invention provides shooting equipment shooting direction control system, which has advantages and features as follows:

1. The circuit module 11 can control the driver 12 and the operation of the power drive unit 32 to rotate the shooting equipment 3 in horizontal direction as well as vertical direction, adjusting the shooting direction accurately.
2. Subject to the design that the shooting equipment 3 is vertically pivotally mounted at the rotary holder shell 2 that is horizontally rotatably mounted at the base unit 1, adjustment of the shooting direction of the shooting equipment 3 is free from the effect of the weight of the shooting equipment 3.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A shooting equipment shooting direction control system for shooter game, comprising:
   a base unit comprising a circuit module, said circuit module comprising a first micro switch and a second micro switch arranged facing each other and separated by a predetermined distance, a driver electrically coupled to said circuit module and controllable by the circuit module to rotate between two reversed directions, and a transmission mechanism coupled to and rotatable by said driver;
   a rotary holder shell capped on said base unit and rotatable by said transmission mechanism, said rotary holder shell comprising an accommodation chamber, an input coupling member fixedly suspending in said accommodation chamber and coupled to said transmission mechanism, a baffle fixedly suspending in said accommodation chamber between said first micro switch and said second micro switch and movable with said rotary holder shell to touch one of said first micro switch and said second micro switch, a recessed receiving chamber located in a top wall thereof above said accommodation chamber, two pivot holes disposed at two opposite sides relative to said recessed receiving chamber, and a third micro switch and a fourth micro switch arranged at two opposite sides relative to one said pivot hole and facing each other and separated by a predetermined distance and respectively electrically coupled to said circuit module; and
   a shooting equipment comprising an equipment base accommodated in said recessed receiving chamber of said rotary holder shell, said equipment base comprising therein a storage chamber, a power drive unit mounted in said storage chamber and controllable by said third micro switch and said fourth micro switch, two pivot pins respectively arranged at two opposite lateral sides of said equipment base and respectively coupled to said pivot holes of said rotary holder shell and rotatable with said equipment base by said power drive unit in a vertical direction relative to said rotary holder shell and said base unit, a dogleg-shaped trigger protruded from the periphery of one said pivot pin and suspending between said third micro switch and said fourth micro switch, and a gun body mounted at a top side of said equipment base.

2. The shooting equipment shooting direction control system for shooter game as claimed in claim 1, wherein said first micro switch and said second micro switch are separated horizontally at a predetermined angle in the range of 80°~150°.

3. The shooting equipment shooting direction control system for shooter game as claimed in claim 2, wherein said first micro switch and said second micro switch are separated horizontally at a predetermined angle of 120°.

4. The shooting equipment shooting direction control system for shooter game as claimed in claim 1, wherein said driver is selected from the group of motor, hydraulic cylinder and pneumatic cylinder; said transmission mechanism is selected from the group of gear transmission mechanism, belt transmission mechanism, chain transmission mechanism and chain wheel type transmission mechanism.

5. The shooting equipment shooting direction control system for shooter game as claimed in claim 1, wherein said input coupling member of said rotary holder shell is a female coupling member selected from the group of latch hole, plughole and screw hole; said transmission mechanism comprises an output coupling member which is a male coupling member selected from the group of latch, plug rod and screw bolt for mating said female coupling member of said input coupling member.

6. The shooting equipment shooting direction control system for shooter game as claimed in claim 1, wherein said rotary holder shell comprises two pivot seats respectively located at two opposite lateral sides of said recessed receiving chamber, and two pivot covers respectively capped on said two pivot seats; said pivot holes are respectively defined in between said pivot seats and said pivot covers.

7. The shooting equipment shooting direction control system for shooter game as claimed in claim 1, wherein said third micro switch and said fourth micro switch are separated vertically at a predetermined angle in the range of 20°~90°.

8. The shooting equipment shooting direction control system for shooter game as claimed in claim 7, wherein said third micro switch and said fourth micro switch are separated vertically at a predetermined angle of 45°.

9. The shooting equipment shooting direction control system for shooter game as claimed in claim 1, wherein said power drive unit of said shooting equipment is selected from the group of reversible motor, hydraulic cylinder and pneumatic cylinder and coupled to said equipment base through a transmission mechanism selected from the group of the group of gear transmission mechanism, belt transmission mechanism, chain transmission mechanism and chain wheel type transmission mechanism.

\* \* \* \* \*